United States Patent
Lopez et al.

(10) Patent No.: US 11,068,352 B2
(45) Date of Patent: Jul. 20, 2021

(54) AUTOMATIC DISASTER RECOVERY MECHANISM FOR FILE-BASED VERSION CONTROL SYSTEM USING LIGHTWEIGHT BACKUPS

(71) Applicant: Oracle International Corporation, Redwood Shores, CA (US)

(72) Inventors: Jonathan Lopez Lopez, San Mateo, CA (US); Juan Ignacio Vimberg, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 583 days.

(21) Appl. No.: 15/434,475

(22) Filed: Feb. 16, 2017

(65) Prior Publication Data
US 2018/0074916 A1    Mar. 15, 2018

Related U.S. Application Data

(60) Provisional application No. 62/395,220, filed on Sep. 15, 2016, provisional application No. 62/395,341, filed on Sep. 15, 2016.

(51) Int. Cl.
*G06F 11/14* (2006.01)
*G06F 11/00* (2006.01)

(52) U.S. Cl.
CPC .......... *G06F 11/1469* (2013.01); *G06F 11/00* (2013.01); *G06F 11/1451* (2013.01); *G06F 2201/84* (2013.01)

(58) Field of Classification Search
CPC .. G06F 11/00; G06F 11/1469; G06F 11/1451; G06F 2201/84
See application file for complete search history.

(56) References Cited

U.S. PATENT DOCUMENTS

| | | | |
|---|---|---|---|
| 6,993,539 B2 * | 1/2006 | Federwisch | G06F 11/2066 |
| 7,418,435 B1 * | 8/2008 | Sedlar | G06F 16/188 |
| 8,200,638 B1 * | 6/2012 | Zheng | G06F 11/1469 707/679 |
| 8,768,901 B1 * | 7/2014 | Somerville | G06F 11/1451 707/697 |

(Continued)

*Primary Examiner* — Kris E Mackes
*Assistant Examiner* — Tiffany Thuy Bui
(74) *Attorney, Agent, or Firm* — Trellis IP Law Group, PC (57) ABSTRACT

In one implementation, lightweight incremental backups are created by a data recovery tool, which provides an extra layer of protection against data loss, and also provides a way of moving repositories between databases without the need of copying each of the repositories. Implementations include backing up a distributed cluster of services providing a simple, safe, and convenient way of instantiating files system repositories in a database, thereby avoiding the performance and scalability issues of using a database repository itself. In other implementations, a lightweight backup object is created that includes a threshold amount of compressed information. The lightweight backup objects may be configured to provide the differences between revisions, and/or may be configured to replicate or rebuild the repository from scratch. Implementations may be configured to backup and restore any single or revision set in any repository state either online or offline.

20 Claims, 6 Drawing Sheets

(56) References Cited

U.S. PATENT DOCUMENTS

| | | | | |
|---|---|---|---|---|
| 9,037,534 | B1* | 5/2015 | Kolesnikov | G06F 16/258 |
| | | | | 707/602 |
| 9,069,885 | B1* | 6/2015 | Moeller | G06F 11/1448 |
| 2004/0249865 | A1* | 12/2004 | Lee | G06F 11/1461 |
| 2006/0161605 | A1* | 7/2006 | Terazono | G06F 8/71 |
| 2007/0294321 | A1* | 12/2007 | Midgley | G06F 11/1451 |
| 2013/0024435 | A1* | 1/2013 | Poirier | G06F 16/1756 |
| | | | | 707/695 |
| 2014/0149355 | A1* | 5/2014 | Gupta | G06F 11/1446 |
| | | | | 707/652 |
| 2014/0149435 | A1* | 5/2014 | Sisman | G06F 11/362 |
| | | | | 707/751 |
| 2016/0124665 | A1* | 5/2016 | Jain | G06F 16/13 |
| | | | | 711/162 |
| 2017/0177867 | A1* | 6/2017 | Crofton | G06F 21/566 |
| 2018/0018270 | A1* | 1/2018 | Kilaru | G06F 16/1727 |

* cited by examiner

AUTOMATIC DISASTER RECOVERY MECHANISM FOR FILE-BASED VERSION CONTROL SYSTEM USING LIGHTWEIGHT BACKUPS

CROSS REFERENCES TO RELATED APPLICATIONS

This application claims priority from U.S. Provisional Patent Application Ser. No. 62/395,220, entitled AUTOMATIC DISASTER RECOVERY MECHANISM FOR FILE-BASED VERSION CONTROL SYSTEM USING LIGHTWEIGHT BACKUPS, filed on Sep. 15, 2016, and U.S. Provisional Patent Application Ser. No. 62/395,341, entitled SYSTEM FOR PROCESS CLOUD SERVICE, filed on Sep. 15, 2016, which are hereby incorporated by reference as if set forth in full in this application for all purposes.

BACKGROUND

The following relates to data recovery and backup. More specifically the following relates to data recovery in cloud-based systems.

Currently, software versioning and revision control systems such as APACHE SUBVERSION utilize subversion repositories (SVN) that automatically backup data. For example, software developers often use SVN repositories to maintain current and historical versions of files such as source code, web pages, and documentation. Unfortunately, data may be lost if a data corruption or a system crash occurs between backup periods. This issue is further exacerbated when SVN repositories are transferred between data locations, such as found in cloud-based servers, and the like.

To avoid data loss, many users rely on making full data backups. Such full data backups often generate large data files that in turn consume a large amount of data storage. In addition, how often to make such backups provides companies with a choice between backing up data and performance and scalability issues when using a database repository.

To avoid this problem, prior backup systems rely on using differential changes between backups to minimize data storage issues. However, such prior systems do not discriminate on the type of changes and rely on using a fixed set of changes to recreate all or portions of a data set.

One limitation with conventional repositories is that the repository's universal unique identifiers are stored in filesystem repository under another name, and not being backed up into the database as the repository uuid. Unfortunately, as conventional programs keep track of each node matching with the uuid, when a new repository is created, a new repository uuid is created which creates inconsistencies between the runtime configuration and the repository itself.

Therefore, a new and improved method and system of providing data backup and recovery is desired.

SUMMARY

In an implementation, a backup tool is configured to generate lightweight backup objects that may be used to restore some or all of a repository in cases of data loss or corruption and/or when transferring data between data locations. The backup objects provide an extra layer of protection against data loss, and also provides a way of moving repositories between data locations (e.g., pod to pod) without the need of copying each and every one of the repositories.

In other configurations a backup tool is configured to query a data repository, determine a current revision of the data repository, determine the revisions of the changes that have occurred since a previous revision of the data repository with respect to the current revision, analyze the revisions of the changes to determine changes to the a data structure and attributes of the data repository since the previous revisions of the data repository, determine a level of data backup required to recover the data repository to a particular revision, determine from the changes to the data structure and the attributes since the previous revisions of the data repository, and from the level of data backup required, which of the attributes and portions of the data structure are required, and which of the attributes and the portions of the data structure are not required to restore the data repository to the particular revision, and generate a backup object from the attributes and the portions of the data structure required to recover the data repository to the particular revision.

In other implementations, the backup tool analyzes the structure of the repositories to adjust the content of the backup object relative to the amount of information needed to recover some or the entire repository. For example, the backup objects may be configured to provide the differences between revisions, and/or may be configured to replicate or rebuild the repository from scratch. Unlike current backup technologies, implementations of the backup tool may be configured to backup and restore any single or revision set in any repository state either online or offline, and may do so in real-time.

In other implementations, to minimize network communication between nodes and thereby preserve processor resources and improve processor efficiency, a repository synchronization logic is implemented which utilizes the backup objects, such that each out of sync server is able to replicate or restore missing information in a hot (online) state.

A further understanding of the nature and the advantages of particular embodiments disclosed herein may be realized by reference of the remaining portions of the specification and the attached drawings.

DETAILED DESCRIPTION OF EMBODIMENTS

Implementations of a data backup system and data backup tool are described herein which are configured to work with data repositories, such as a SVN (Subversion) repository. Conceptually, a repository is similar to a folder or directory on a computer containing a collection of assorted, but related, files and directories. A repository is typically used to store all the files and directories that make up a single project, or perhaps even a collection of interrelated projects. However, repositories also store the history of those files, unlike a normal folder on a computer that stores only the most recent copy of a collection of files.

In one implementation, the data backup tool operates with a repository composed of a collection of files and directories that are bundled together in a database. Generally, a complete history of all the changes made to such files and directors is saved in the database. The data backup tool may be configured to create lightweight incremental backups, also referred to herein as backup objects, from the history, which are configured to provide an extra layer of protection against data loss, and also provide a means for moving repositories between data locations, such as from pod to pod, without the need of copying each of the repositories.

In other implementations, the backup objects are created with a threshold amount of compressed information that varies relative to the needs of the system, user input, processor efficiency, accuracy, etc. For example, the backup objects may be configured to provide the differences between revisions, and/or may be configured to replicate or rebuild the repository from scratch. Implementations may also be configured to backup and restore any single or revision set in any repository state either online or offline.

In some implementations the data backup system and data backup tool are configured to back up a distributed cluster of services, such as an Oracle Veritas Custer Service (VCS) which includes a cluster of nodes configured to provide a simple, safe, and convenient way of instantiating files system repositories in a database, thereby avoiding the performance and scalability issues of using a database repository itself. In addition, by providing data backup objects that vary with the needs of the system and/or user requirements, the data backup system and data backup tool provide a means to enhance and vary data processing speed, efficiency, and accuracy relative to the processing needs of the system and/or network.

Figure 1:
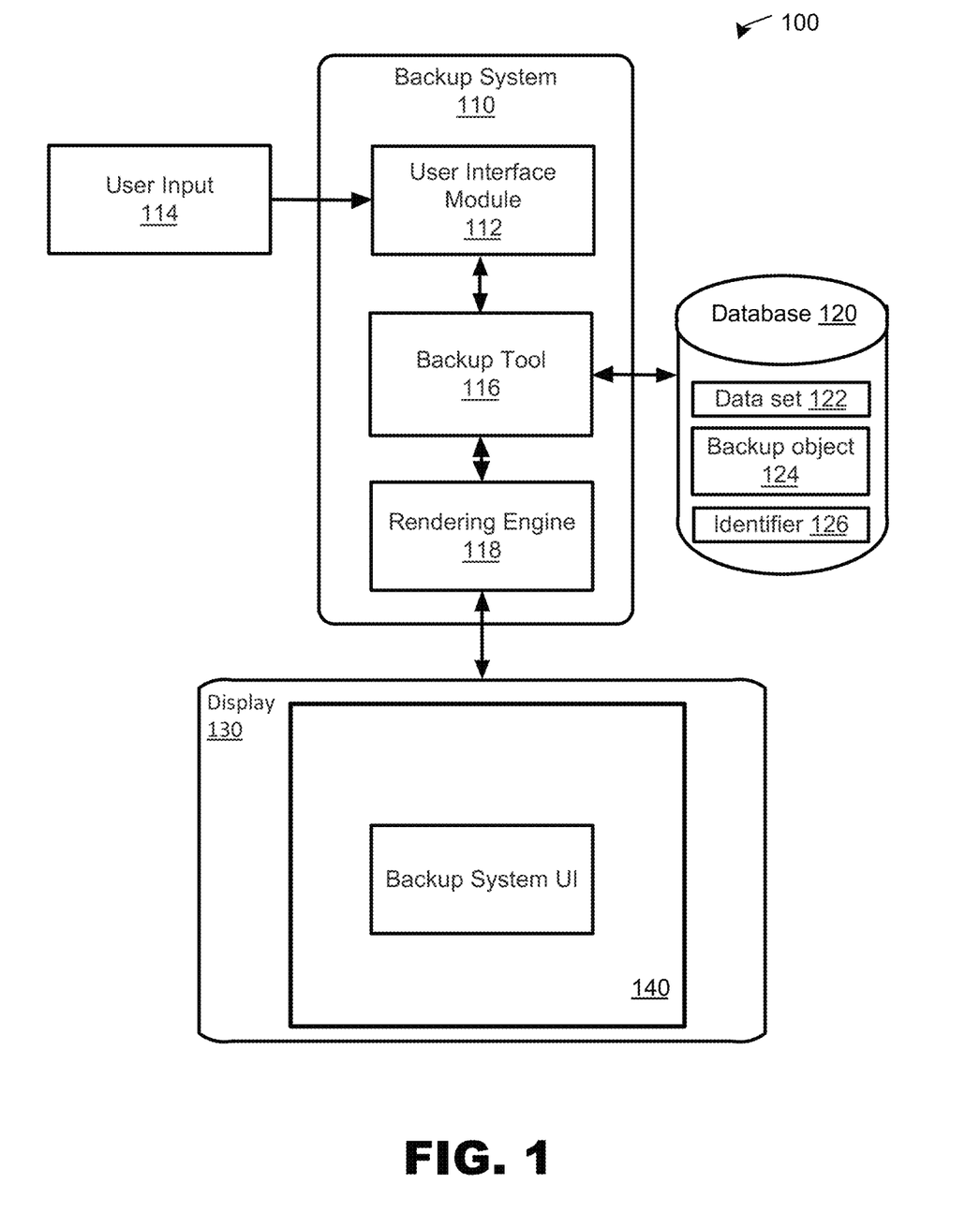
FIG. 1 is a high level illustration of a data backup system.

FIG. 1 is a high-level block diagram of an exemplary computing system 100. computing system 100 may be any computing system, such as an enterprise computing environment, client-server system, and the like. Computing system 100 includes data backup system 110 configured to process data received from a user interface 114, such as a keyboard, mouse, etc.

Note that computing system 100 presents a particular example implementation, where computer code for implementing embodiments may be implemented, at least in part, on a server. However, embodiments are not limited thereto. For example, a client-side software application may implement data backup system 110, or portions thereof, in accordance with the present teachings without requiring communications between the client-side software application and a server.

In one exemplary implementation, data backup system 110 is connected to display 130 configured to display graphical data 140, for example, to a user thereof. Display 130 may be a passive or an active display, adapted to allow a user to view and interact with graphical data 140 displayed thereon, via user interface 114. In other configurations, display 130 may be a touch screen display responsive to touches, gestures, swipes, and the like for use in interacting with and manipulating graphical data 140 by a user thereof. Gestures may include single gestures, multi-touch gestures, and other combinations of gestures and user inputs adapted to allow a user to convert, model, generate, deploy, and maintain graphical data 140 and associated data structures, software programs, etc.

In other implementations, computing system 100 may include a data source such as database 120, which is configured as and/or includes a data repository. For example, database 120 maybe configured as a data repository designated for data storage. However, database 120 may also be configured as a particular kind of data storage setup within an overall IT structure, such as a group of databases, where for example, an enterprise or organization has chosen to keep various kinds of data.

Database 120 may be connected to the data backup system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to data attributes, data hierarchy, nodal positions, values, summations, visualizations, algorithms, code (e.g., C++, Javascript, JSON, etc.), source, security, hashes, XML, XSD, XSLT, changesets, data objects, and the like. In addition, data sets 122 may also contain other data, data elements, and information such as metadata, labels, development-time information, runtime information, configuration information, API, interface component information, library information, pointers, and the like.

Data backup system 110 may include user interface module 112, data backup tool 116, and rendering engine 118. User interface module 112 may be configured to receive and process data signals and information received from user interface 114. For example, user interface module 112 may be adapted to receive and process data from user input associated with graphical data 140 for processing via data backup system 110.

In an exemplary implementation, data backup tool 116 may be adapted to receive data from user interface 114 and/or database 120 for processing thereof. In one configuration, data backup tool 116 is a software engine configured to receive and process input data from a user thereof pertaining to graphical data 140 and associated data structures, software programs, and the like, from user interface module 114 and/or database 120 in order to backup data stored in data repositories, databases, Cloud storage, storage systems, etc.

Backup tool 116 in other implementations may be configured as a data analysis tool to perform analysis functions associated with graphical data 140 and associated data structures, software programs, and the like. Such analysis functions may include determining the attributes associated with the data, determining the type of data, determining the values of the data, determining the relationships to other data, interpreting metadata associated with the data, and the like. For example, Data backup tool 116 may be configured to receive and analyze data sets 122 to determine historical data, data compatibility, user interface configuration, data processing instructions, data attributes, data hierarchy, nodes, nodal positions within the hierarchy, values, summations, algorithms, source, security, hashes, and the like, associated with data sets 122. Such data set analysis may include nodal analysis, recursive analysis, and other data analysis techniques.

Data backup tool 116 may receive existing data sets 122 from database 120 for processing thereof. Such data sets 122 may include and represent a composite of separate data sets 122 and data elements pertaining to, for example, organizational data, which may include employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to graphical data 140 and other data structures, software programs, user interface components, icons, user pointing device signals, and the like, used to render graphical data 140 on display 130. In one exemplary implementation, rendering engine 118 may be configured to render 2D and 3D graphical models and simulations to allow a user to obtain more information about data sets 122 associated with graphical data 140. In one implementation, upon receiving instruction from a user, for example, through user interface 114, rendering engine 118 may be configured to generate a real-time display of interactive changes being made to graphical data 140 by a user thereof.

In one implementation, backup tool 116 is configured to operate with a database 120 configured as and/or includes a data repository that maintains a history (such as SVN repository) providing revisions that record copies of all the files and directories that make up a project at specific points in time. However instead of storing full copies of each revision of every file, backup tool 116 generates a variable amount of changes or differences between files at each revision as lightweight backup objects 124 that are configured to adapt to the needs of the system and/or the user.

Backup objects 124 may be configured to provide a description of some or all of the additions, modifications, deletions, etc. to files within a project that are required to go from one revision to the next revision. Backup objects 124 may also be configured to provide a human-friendly text description that reports the nature of the changes. A collection of backup objects 124 in a project may make up a repository. Data backup tool 116 utilizes individual or groups of backup objects 124 to recreate virtually any revision of any file in the database 120, at any point in time exactly, or within a threshold accuracy limit.

In some implementations, a software program, such as subversion, stores into some or all the repositories a unique identifier 126, used by the client to know whether the working copy it's effectively connected to the expected repository. Identifier 126 may be any unique number, hash, checksum, and the like that uniquely identifies the node or group of nodes.

In one implementation, several nodes (e.g., High Availability mode) may be given the same identifier 126 to prevent SVN from associating the nodes with different repositories. In other implementations, identifier 126 is configured to be unique, for example, by giving identifier 126 a unique name (e.g. repository_uuid). In such implementations, identifier 126 may act as a proxy identifier that systems such as SVN ignore, while allowing backup system 110 to clearly differentiate each node.

To resolve the limitations of repositories, such as a SVN repository, a program such as "RuntimeManager" stores the backup server (BAC) configuration into a program that manages the configuration, such as "ConfigManager." In doing so, a mapping is created such as "Partition+NodeUUID=NodeName". Since at least two of the three variables from the mapping are known, the repository_uuid (NodeUUID) expected for the node and a particular Space (Partition) may be deduced or inferred by backup tool 116.

Thus, instead of generating a random unique identifier during the repository creation, the backup tool 116 sets and stores the value obtained, for example, in commit-0, keeping full consistency, between repositories or migration to different cloud based servers, units, etc., such as a pod described in "The Oracle Service Cloud Platform" white paper, dated May 2016, incorporated by reference herein for all purposes.

In implementations, a pod is configured as a "point of delivery," which is a deployable module that delivers a service. In one implementation, a pod includes a deployable unit built for modularity and scalability, which is meant to be replicated as needed. Another embodiment can include: a module of network, compute, storage, and application components that work together to form a repeatable design pattern. In another embodiment a pod comprises all the different parts that need to be setup to provision a client with an instance of the service, which may include, for example, Weblogic platform nodes, Database, Coherence cluster, Filesystem, etc.

In a further implantation, in addition to database clusters and firewalls, arrays of other optional servers like Chat, Email, Utility, and File Attachment, and the like, function together to comprise what is known as a pod. A customer's presence on a pod may be referred to as a customer site. One or more pods exist in each physical data center, and each pod can have a corresponding disaster recovery—or DR—pod to which its data is replicated and which can be activated in the event of fault in the primary pod.

Figure 2:
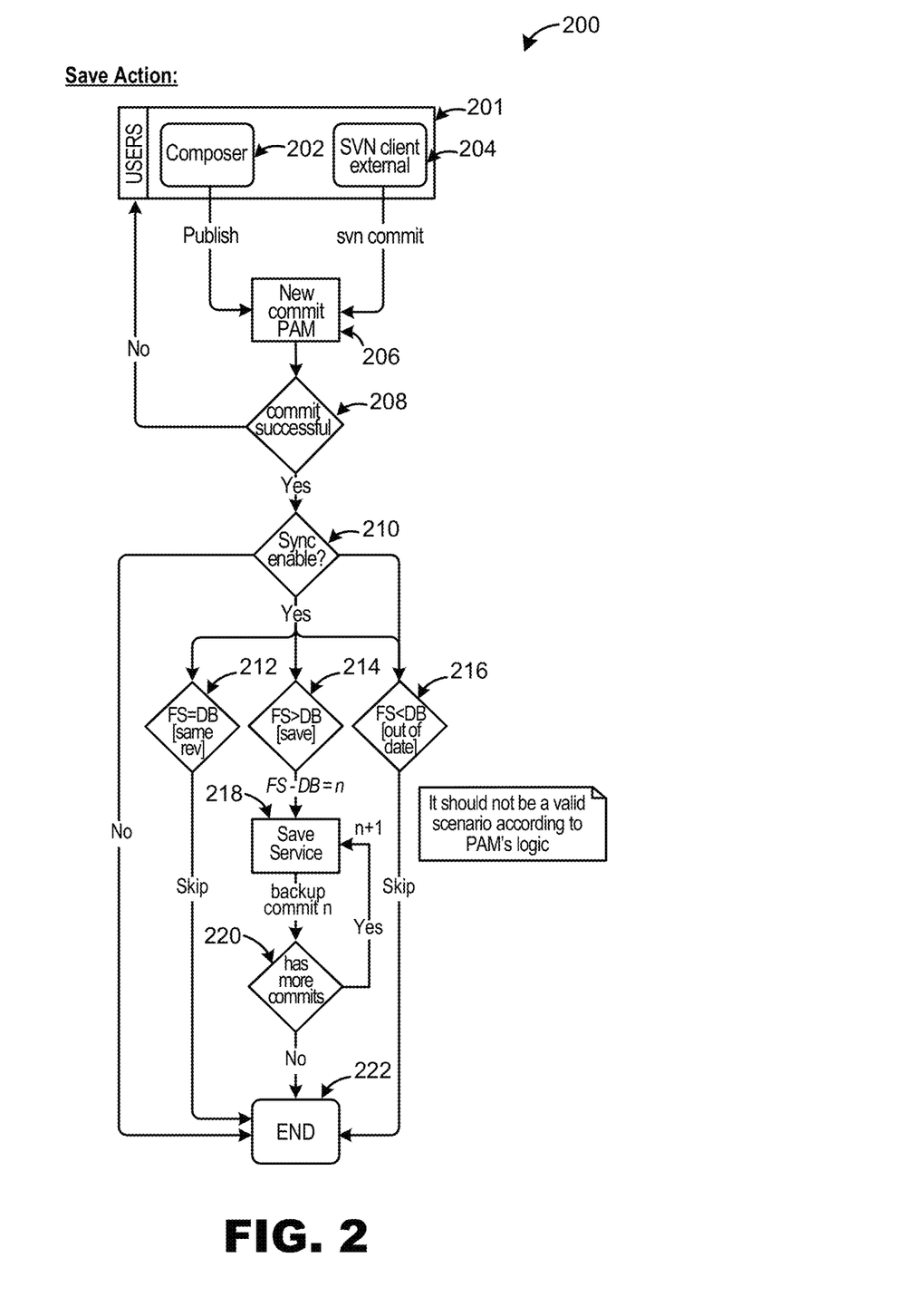
FIG. 2 is a flow diagram for a save action.

FIG. 2 is a flow diagram for a method 200 for a save data action. At step 201, method 200 may be initiated for example, by operating backup system 110. At 202 method looks to whether the user is using a tool, (e.g., composer) for composing a project. At 204, method 200 looks to whether and external client e.g., SVN client, is being used by a user. Either 202 and 204 are configured to send a trigger action, such as a commit to a server such as Pluggable Authentication Module (PAM) to 206. In some implementations a PAM framework is configured to allow a user "plug in" new authentication services without changing system entry services, such as login, ftp, telnet, and the like.

At 208, if the trigger is successful, then method 200 proceeds to 210. However, if the trigger is not successful then method 200 proceeds to 201.

At 210, method 200 determines whether a sync function is enabled, if so, then method 200 proceeds to either 212, 214, or 216 depending on the files system revision relative to the size of the database. If at 210, sync is not enabled, then method 200 ends at 222. At 212, if the file system revision is equal to the database revision then the method 200 ends at 222. If at 214, file system revision is greater than the database revision method 200 proceeds to 218 to start a save service. If at 216, the file system revision is less than the database revision then method 200 ends at 222.

At 218 the save service generates a backup trigger, such as a backup commit. At 220, method 200 determines whether there are more backup triggers to process. If so, them method 200 returns to 218. If not method 200 proceeds to 222 and ends.

Figure 3:
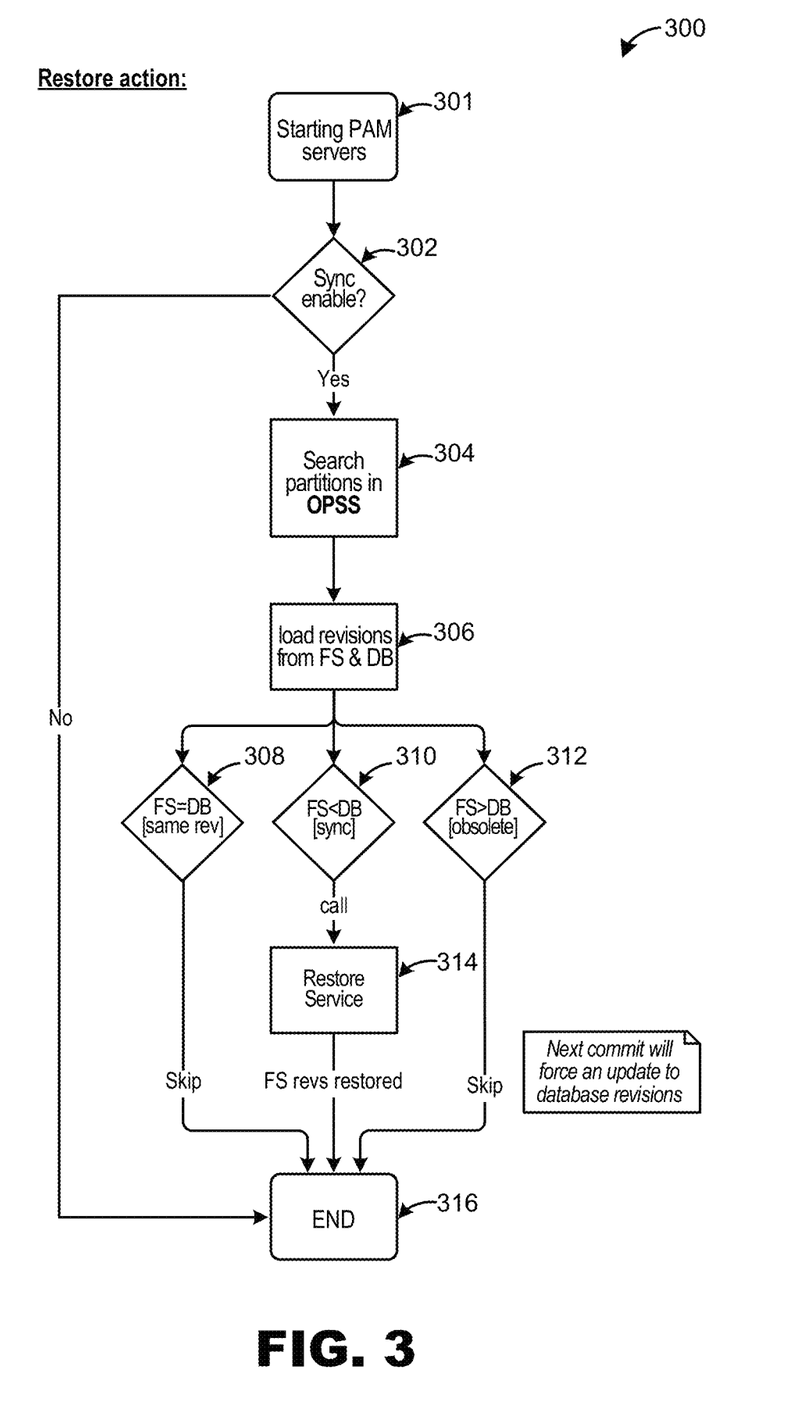
FIG. 3 is a flow diagram for a restore action.

FIG. 3 is a flow diagram for a method 300 for a restore action. At step 301, method 300 may be initiated for example, by operating backup system 110. At 302 method 300 looks to whether sync is initiated. If at 302 sync is enabled, then method 300 proceeds to 304. However, if at 302 sync is not enabled, then method 300 ends at 316.

At 304, method 300 searches partitions for revisions of the file system and database. At 306, revisions of the file system and database are stored in memory, such as database 120, and method 300 proceeds to 308, 310, or 312 depending on relative revisions of the file system and database. At 308, if the file system revision is equal to the database revision then the method 300 ends at 316. If at 310, file system revision is less than the database revision, method 300 proceeds to 314 to start a restore service. If at 312, the file system revision is less than the database revision then method 300 ends at 316.

Figure 4:
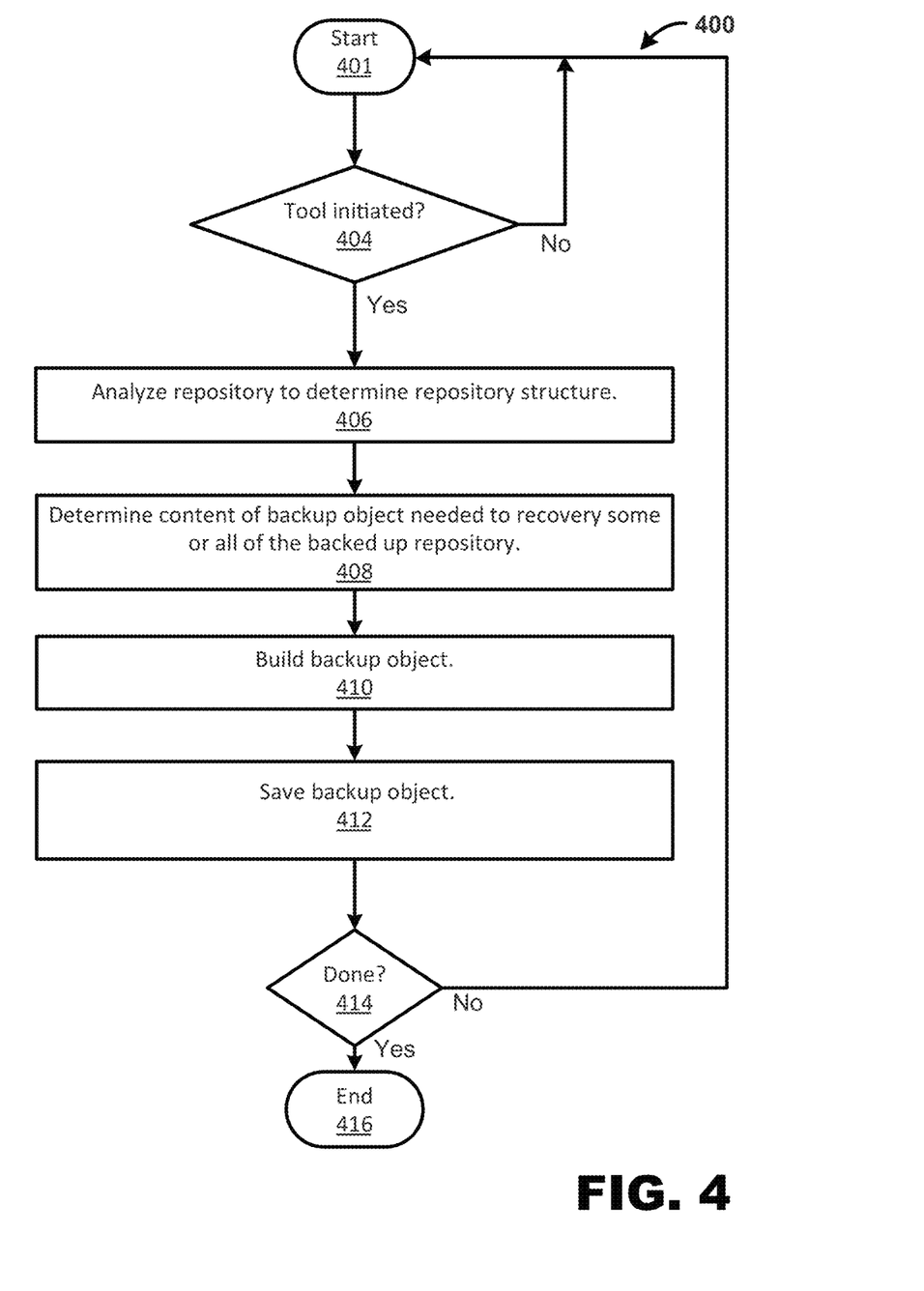
FIG. 4 is a flow diagram of an example method adapted for use with implementations, and variations thereof, illustrated in FIGS. 1-3, and 5.

FIG. 4 is a flow diagram of an example method 400 adapted for use with implementations, and variations thereof, illustrated in FIGS. 1-3, and 5. Method 400 may be initiated for example at 401, by backup system 110 being used to generate individual and/or groups of backup objects 124. At 404, method 400 determines if a backup tool, such as backup tool 116, has been initiated. If backup tool 116 has not been initiated, then method 400 proceeds to 401. If backup tool 116 has been initiated, then at 406, a data repository's data structure and attributes are analyzed which may include determining a current repository revision, commits property revision, commits revisions, and the like. At 408, determines the configuration of the backup object needed to recover some or the entire repository.

In some scenarios, method 400 infers from the repository data structure and attributes, what attributes, data, revision data, etc. are needed and which attributes, data, revision data, etc. are not needed to fully or partially restore the repository.

At 410, the backup object is generated. At 412, the backup object 124 is stored. For example, backup object 124 may be stored in a compressed file, such as a ZIP file. Advantageously, unlike current backup systems that do not discriminate and save all of the structural and hierarchical data of the repository, backup object 124 generated by method 400 requires considerably less memory usage thereby improving processor function and efficiency.

Figure 5:
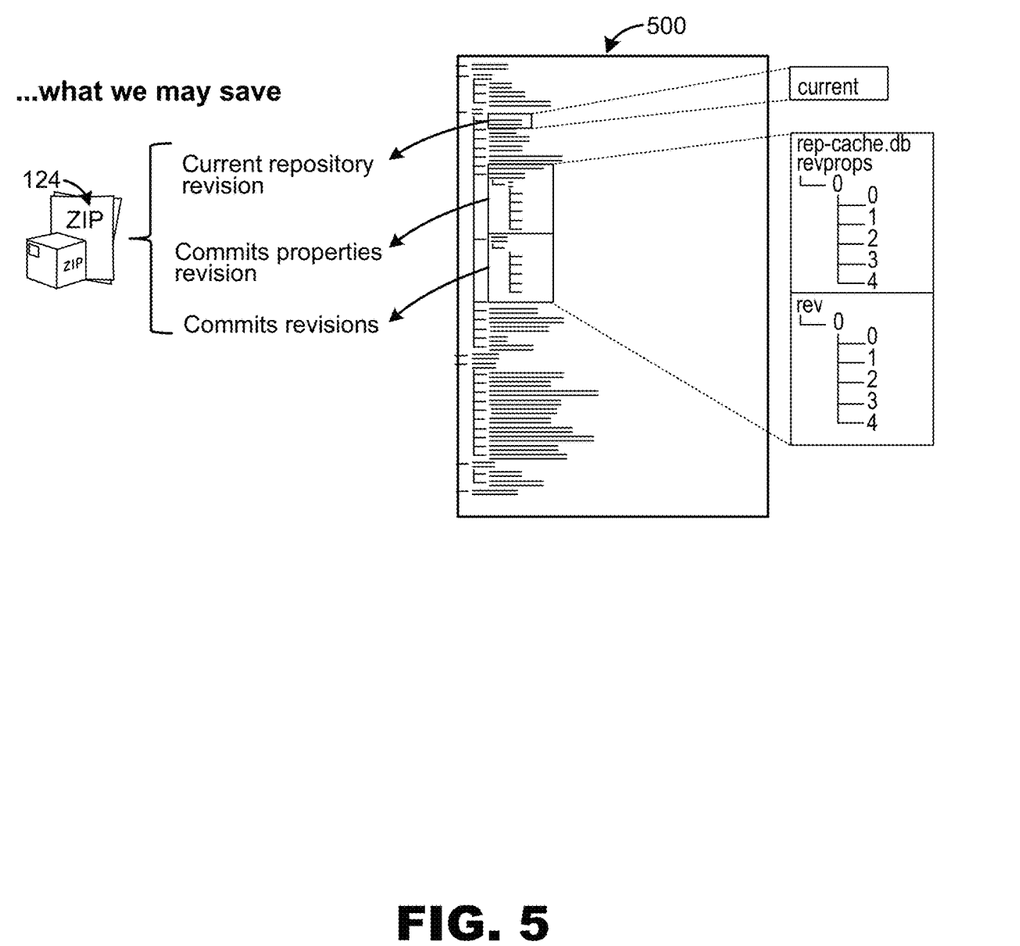
FIG. 5 illustrates an example backup object and elements thereof.

FIG. 5 illustrates an example backup object data structure 500 describing the contents and elements that may be stored in backup object 124. In one implementation, data structure 500 includes a variable amount of contents relative to the needs of the system. For example, as illustrated, data structure 500 includes a current repository revision, commits property revisions, and commits revisions.

In some implementations, backup tool 116, analyzes the contents of data structure 500 to determine which portions of the structure are required for a partial or complete backup relative to the needs of the user and/or system. For example, backup tool 116 may determine that only the contents required to restore differences between revisions are required, or that more of the contents of data structure 500 are required to restore the data set 122 from scratch.

In some implementation, backup tool 116, may be configured to use analysis techniques such as nodal analysis to analyze nodes of structural and hierarchical data found in data structures representing a data repository, such as data structure 500, in order to determine which portions relevant for restoring data relative to a user and/or system requirement. For example, backup tool 116 may analyze earlier revisions of the structural and hierarchical data of the data repository to determine that no changes were made between some of the structural and hierarchical data revisions. As such, backup tool 116 may be configured to ignore at least some of the unchanged revisions, thereby improving data processing efficiency by not processing redundant revisions.

Figure 6:
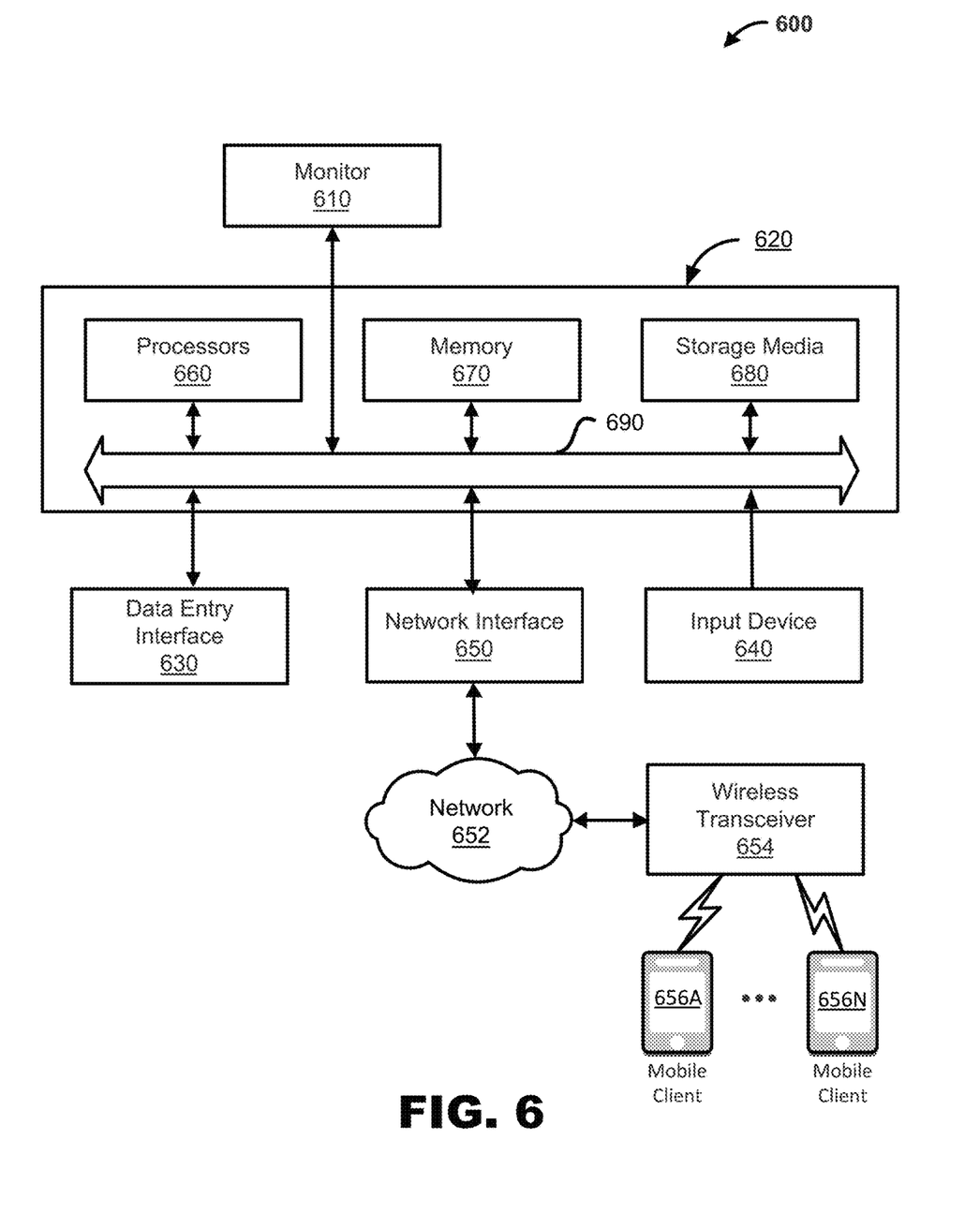
FIG. 6 is a high-level block diagram of an exemplary computer and communication system.

FIG. 6 is a block diagram of an exemplary computer system 600 for use with implementations described in FIGS. 1-5. Computer system 600 is merely illustrative and not intended to limit the scope of the claims. One of ordinary skill in the art would recognize other variations, modifications, and alternatives. For example, computer system 600 may be implemented in a distributed client-server configuration having one or more client devices in communication with one or more server systems.

In one exemplary implementation, computer system 600 includes a display device such as a monitor 610, computer 620, a data entry device 630 such as a keyboard, touch device, and the like, a user input device 640, a network communication interface 650, and the like. User input device 640 is typically embodied as a computer mouse, a trackball, a track pad, wireless remote, tablet, touch screen, and the like. Moreover, user input device 640 typically allows a user to select and operate objects, icons, text, characters, and the like that appear, for example, on the monitor 610.

Network interface 650 typically includes an Ethernet card, a modem (telephone, satellite, cable, ISDN), (asynchronous) digital subscriber line (DSL) unit, and the like. Further, network interface 650 may be physically integrated on the motherboard of computer 620, may be a software program, such as soft DSL, or the like.

Computer system 600 may also include software that enables communications over communication network 652 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 652 may include a local area network, a wide area network, a wireless network, an Intranet, the Internet, a private network, a public network, a switched network, or any other suitable communication network, such as for example Cloud networks. Communication network 652 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 652 may communicate to one or more mobile wireless devices 656A-N, such as mobile phones, tablets, and the like, via a base station such as wireless transceiver 654.

Computer 620 typically includes familiar computer components such as one or more processors 660, and memory storage devices, such as a memory 670, e.g., random access memory (RAM), storage media 680, and system bus 690 interconnecting the above components. In one embodiment, computer 620 is a PC compatible computer having multiple microprocessors, graphics processing units (GPU), and the like. While a computer is shown, it will be readily apparent to one of ordinary skill in the art that many other hardware and software configurations are suitable for use with the present invention.

Memory 670 and Storage media 680 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive. Further details of embodiments may be found in the attached documents provided with this application.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:
   querying a data repository that includes a collection of files and directories associated with one or more inter-related projects and a history of the files;
   determining a current revision of the data repository;
   determining revisions of changes that have occurred since previous revisions of the data repository with respect to the current revision of the data repository;
   analyzing the revisions of the changes to determine changes to a data structure and attributes of the data repository since the previous revisions of the data repository;
   determining a level of data backup required to recover the data repository to a particular revision;
   determining a data backup threshold accuracy configured to set a backup data accuracy to a specified backup data accuracy limit;
   determining from the changes to the data structure, the attributes since the previous revisions of the data repository, the level of data backup required, and the specified backup data accuracy limit, which of the attributes and portions of the data structure are required, and which of the attributes of the data repository and the portions of the data structure are not required to restore the data repository to the particular revision;
   generating a backup object from the attributes and the portions of the data structure are required to recover the data repository to the particular revision, wherein the backup object is generated to include the required attributes and the required portions of the data structure without including the attributes and the portions of the data structure that are not required based on a history of the changes to the data structure;
   configuring the backup object to provide a human-friendly text description that reports nature of the changes; and storing the backup object as a compressed file.

2. The non-transitory computer readable medium of claim 1, wherein the data repository comprises an SVN repository.

3. The non-transitory computer readable medium of claim 1, wherein the revisions of the changes comprises commit revisions.

4. The non-transitory computer readable medium of claim 1, wherein analyzing the revisions of the changes further comprises determining redundant changes to the data structure since the previous revisions of the data repository.

5. The non-transitory computer readable medium of claim 1, wherein analyzing the revisions of the changes further comprises determining redundant changes to the attributes since the previous revisions of the data repository.

6. The non-transitory computer readable medium of claim 1, wherein the level of data backup required to recover the data repository to a particular revision comprises a partial backup.

7. The non-transitory computer readable medium of claim 1, wherein the level of data backup required to recover the data repository to a particular revision comprises a full backup.

8. The non-transitory computer readable medium of claim 1, further comprising providing a plurality of nodes of the data repository with a common identifier.

9. The non-transitory computer readable medium of claim 8, further comprising using the common identifier and a partition attribute to generate a mapping configured to generate a unique identifier for a node.

10. The non-transitory computer readable medium of claim 9, further comprising processing the mapping to generate the unique identifier for the node.

11. A processor implemented method comprising:
    querying a data repository that includes a collection of files and directories associated with one or more inter-related projects and a history of the files;
    determining a current revision of the data repository;
    determining revisions of changes that have occurred since previous revisions of the data repository with respect to the current revision;

analyzing the revisions of the changes to determine changes to a data structure and attributes of the data structure since the previous revisions of the data repository;

determining a level of data backup required to recover the data repository to a particular revision;

determining a data backup threshold accuracy configured to set a backup data accuracy to a specified backup data accuracy limit; determining from the changes to the data structure, the attributes since the previous revisions of the data repository, the level of data backup required, and the specified backup data accuracy limit, which of the attributes of the data repository and portions of the data structure are required, and which of the attributes and the portions of the data structure are not required to restore the data repository to the particular revision;

generating a backup object from the attributes and the portions of the data structure are required to recover the data repository to the particular revision, wherein the backup object is generated to include the required attributes and the required portions of the data structure without including the attributes and the portions of the data structure that are not required based on a history of the changes to the data structure;

configuring the backup object to provide a human-friendly text description that reports nature of the changes; and storing the backup object as a compressed file.

12. The method of claim 11, wherein the data repository comprises an SVN repository.

13. The method of claim 11, wherein the revisions of the changes comprises commit revisions.

14. The method of claim 11, wherein analyzing the revisions of the changes further comprises determining redundant changes to the data structure since the previous revisions of the data repository.

15. The method of claim 11, wherein analyzing the revisions of the changes further comprises determining redundant changes to the attributes since the previous revisions of the data repository.

16. The method of claim 11, wherein the level of data backup required to recover the data repository to a particular revision comprises a partial backup.

17. The method of claim 11, wherein the level of data backup required to recover the data repository to a particular revision comprises a full backup.

18. The method of claim 11, further comprising providing a plurality of nodes of the data repository with a common identifier.

19. The method of claim 18, further comprising using the common identifier and a partition attribute to generate a mapping configured to generate a unique identifier for a node.

20. An apparatus comprising:
a memory containing computer readable medium executable code having stored thereon instructions for backing up data in a computing environment;
one or more processors coupled to the memory, the one or more processors configured to execute the machine executable code to cause the one or more processors to:
query a data repository that includes a collection of files and directories associated with one or more interrelated projects and a history of the files; determine a current revision of the data repository;
determine revisions of changes that have occurred since previous revisions of the data repository with respect to the current revision;
analyze the revisions of the changes to determine changes to a data structure and attributes of the data repository since the previous revisions of the data repository;
determine a level of data backup required to recover the data repository to a particular revision;
determining a data backup threshold accuracy configured to set a backup data accuracy to a specified backup data accuracy limit;
determine from the changes to the data structure, the attributes since the previous revisions of the data repository, the level of data backup required, and the specified backup data accuracy limit, which of the attributes and portions of the data structure are required, and which of the attributes and the portions of the data structure are not required to restore the data repository to the particular revision;
generating a backup object from the attributes and the portions of the data structure are required to recover the data repository to the particular revision, wherein the backup object is generated to include the required attributes and the required portions of the data structure without including the attributes and the portions of the data structure that are not required based on a history of the changes to the data structure;
configuring the backup object to provide a human-friendly text description that reports nature of the changes; and storing the backup object as a compressed file.

* * * * *